(No Model.) 9 Sheets—Sheet 3.

J. COMSTOCK & T. E. JEFFERSON.
SEWER AND MEANS FOR FACILITATING THE DISCHARGE OF SEWAGE.

No. 261,080. Patented July 11, 1882.

WITNESSES:

INVENTOR.

ATTORNEYS.

(No Model.) 9 Sheets—Sheet 5.

J. COMSTOCK & T. E. JEFFERSON.
SEWER AND MEANS FOR FACILITATING THE DISCHARGE OF SEWAGE.
No. 261,080. Patented July 11, 1882.

WITNESSES: INVENTOR.

ATTORNEYS.

(No Model.) 9 Sheets—Sheet 6.

J. COMSTOCK & T. E. JEFFERSON.
SEWER AND MEANS FOR FACILITATING THE DISCHARGE OF SEWAGE.

No. 261,080. Patented July 11, 1882.

WITNESSES: INVENTOR.
ATTORNEYS.

(No Model.) 9 Sheets—Sheet 7.

J. COMSTOCK & T. E. JEFFERSON.
SEWER AND MEANS FOR FACILITATING THE DISCHARGE OF SEWAGE.

No. 261,080. Patented July 11, 1882.

WITNESSES:

INVENTOR.

ATTORNEYS.

UNITED STATES PATENT OFFICE.

JOHN COMSTOCK, OF HUDSON, WISCONSIN, AND THOMAS E. JEFFERSON, OF BOSTON, MASSACHUSETTS.

SEWER AND MEANS FOR FACILITATING THE DISCHARGE OF SEWAGE.

SPECIFICATION forming part of Letters Patent No. 261,080, dated July 11, 1882.

Application filed May 27, 1882. (No model.)

*To all whom it may concern:*

Be it known that we, JOHN COMSTOCK, of Hudson, St. Croix county, Wisconsin, and THOMAS E. JEFFERSON, of Boston, Massachusetts, citizens of the United States, have invented certain new and useful Improvements in Sewers and Treatment of Sewage; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to an improvement in sewers and a method and means for facilitating the discharge of sewage.

The subject-matter of this application has such intimate relation with our systems of ventilation and of utilizing products of combustion, both of which are made subjects of separate applications, that a brief reference to each is necessary to a perfect understanding of the accruing advantages of this invention.

Among others the following objects of the invention may be briefly stated: first, to render a sewer approximately air-tight in such a manner that a mechanically-induced draft will affect its contents throughout the entire area or district over which such draft-inciting mechanism is intended to influence the hasty discharge of sewer-gas, &c., from the sewer, its branches, or connections; second, to provide an approximately air-tight sewer having proper graduated air-inlets, whereby to dilute the sewer-gas, a powerful suction apparatus to create draft within the sewer in one direction, and means for preventing ingress of air through the sewer-outlet; third, to divide the sewer system of large cities into working sections and provide a suction apparatus for each section, each section also having means for preventing backflow of gas or air, whereby the gas may be forced quickly from each section, while the liquid and solid sewage is allowed to seek the sewer-outlet as impelled and accelerated by the draft in each section, the gases being eliminated from each section separately or otherwise, and conveyed away from proximity to with inhabitants, burned, or otherwise disposed of; fourth, to provide an approximately air-tight sewer having disposed at proper distances apart along its length and branches a series of suction apparatus of graduated capacities and force, that apparatus having the greatest force being located at or near the sewer-outlet and adapted to take all the gas eliminated from the next succeeding section and have a sufficient reserve of power to create a partial vacuum in its own section, and so on; fifth, in dividing into working sections the sewer system of large cities and providing each section with a suction apparatus, an independent outlet for the removal of foul gas, and a means for preventing backflow of such gas from one to another, while the sewage has uninterrupted flow toward the main outlet; sixth, to provide an approximately air-tight sewer having suitable air-inlets and a powerful suction apparatus, whereby sufficient air may be admitted behind an obstruction and sufficient draft created within the sewer to remove the obstruction; seventh, to provide traps or seals of varying strengths, arranged in relation to the sewer and suction apparatus so that the seals having the greatest strength shall be nearest said apparatus and the strength be decreased in the ratio of distance from such apparatus; eighth, to provide an approximately air-tight sewer and a powerful suction apparatus creating a draft therein toward the submerged outlet of said sewer, said apparatus being impelled by a steam-engine, the exhaust from which is led to the point of sewage-discharge and utilized to stir up and agitate the combined sewage and water; or, if the suction apparatus be impelled by any power, to provide a wheel, screw, or dasher properly journaled at the sewage-discharge outlet, and connected, by belt or otherwise, to the mechanism of such other power, for the same purpose; ninth, to provide a sewer and an auxiliary conduit, both rendered approximately air-tight, the former being adapted to serve as a channel for sewage and gases and the latter as a channel for commingled gases, each having a powerful suction apparatus, and both such apparatus being hung upon a single shaft and operated by a single motor; tenth, to provide an approximately air-tight sewer having graduated inlets and a powerful suction apparatus susceptible of having its force or power graduated to accommodate the capacity of the sewer, the amount of inlet, and the degree of vacuum required; eleventh, to provide means for subjecting the sewer-gas and commingled vapors to a spray of water to wash the same; twelfth, to deposit the sewage beneath the surface of water as impelled by the draft-inducing mechanism, and by the same means forcing the separated gases further along for burning, discharge, or other treatment; thirteenth, to increase the working capacity of sewers and improve their usefulness by making them the channel of discharge of a larger quantity of sewage; fourteenth, to preserve the sewer structure from the deleterious effects of generated acids of decay by quickly removing the sewage, and thus preventing the generation of such acids.

The features of the invention are fully illustrated in the accompanying drawings, which form a part of this specification, and in which—

Referring to the drawings, A represents the sewer; B, the auxiliary sewer; C, the man-hole; D, the seals or traps of different strengths; E, the furnace; F, the furnace or house pipes; A', the fan or other suction apparatus; Y, the sewer-outlet, and Y' the gate or hood.

In the application made by us for a patent for a system of ventilation, a pipe led from the auxiliary conduit to the interior of apartments having controlling means to regulate the ventilation at will, and passage-connections were also made from stoves, furnaces, &c., to the sewer, in order not only to ventilate such apartments through such furnaces, but to utilize the products of combustion to disinfect and dilute the sewer-gas. The principal points of these inventions are set forth in Fig. 12.

Figure 2:
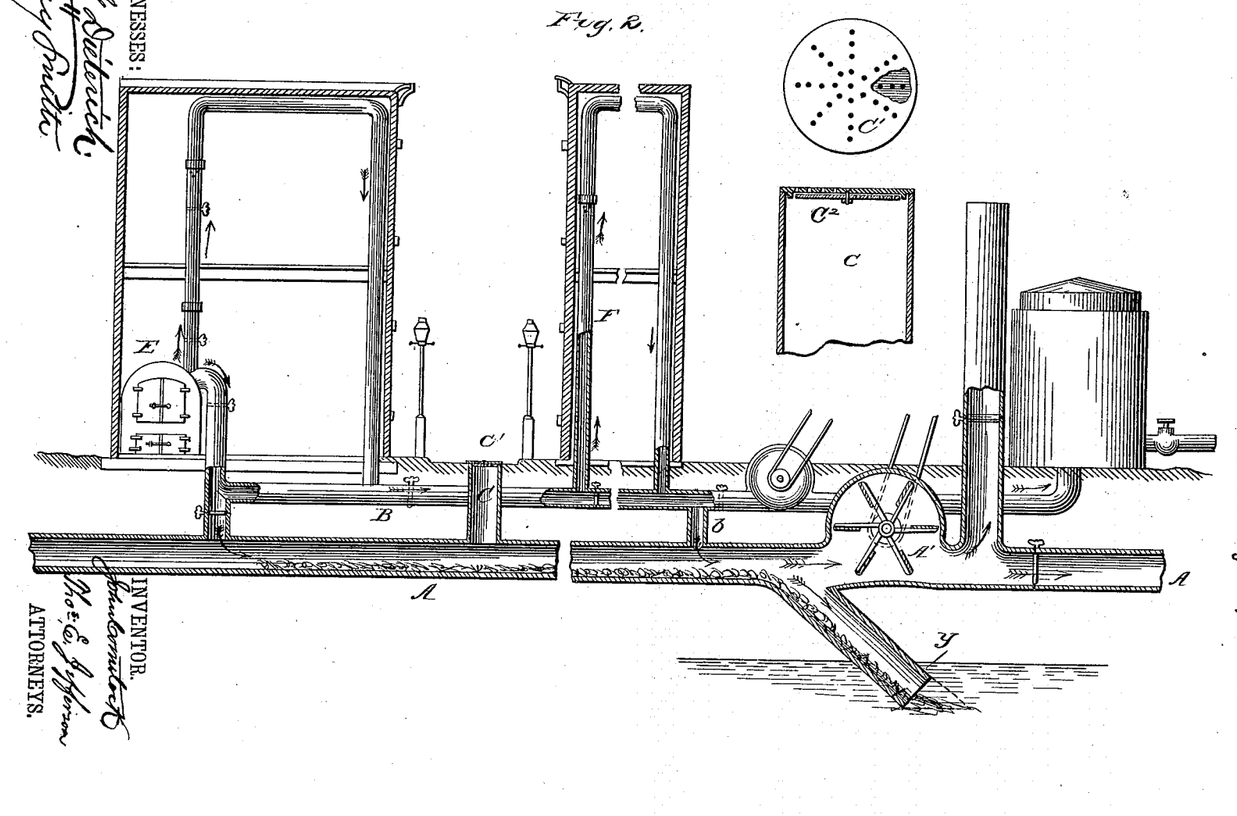
Fig. 2 is a vertical section, showing the sewer and connected conduit, the submerged sewer-outlet, the fan, and the continuation of the sewer through which the separated sewer-gas is forced, also the graduating man-hole cover.
Figure 3:
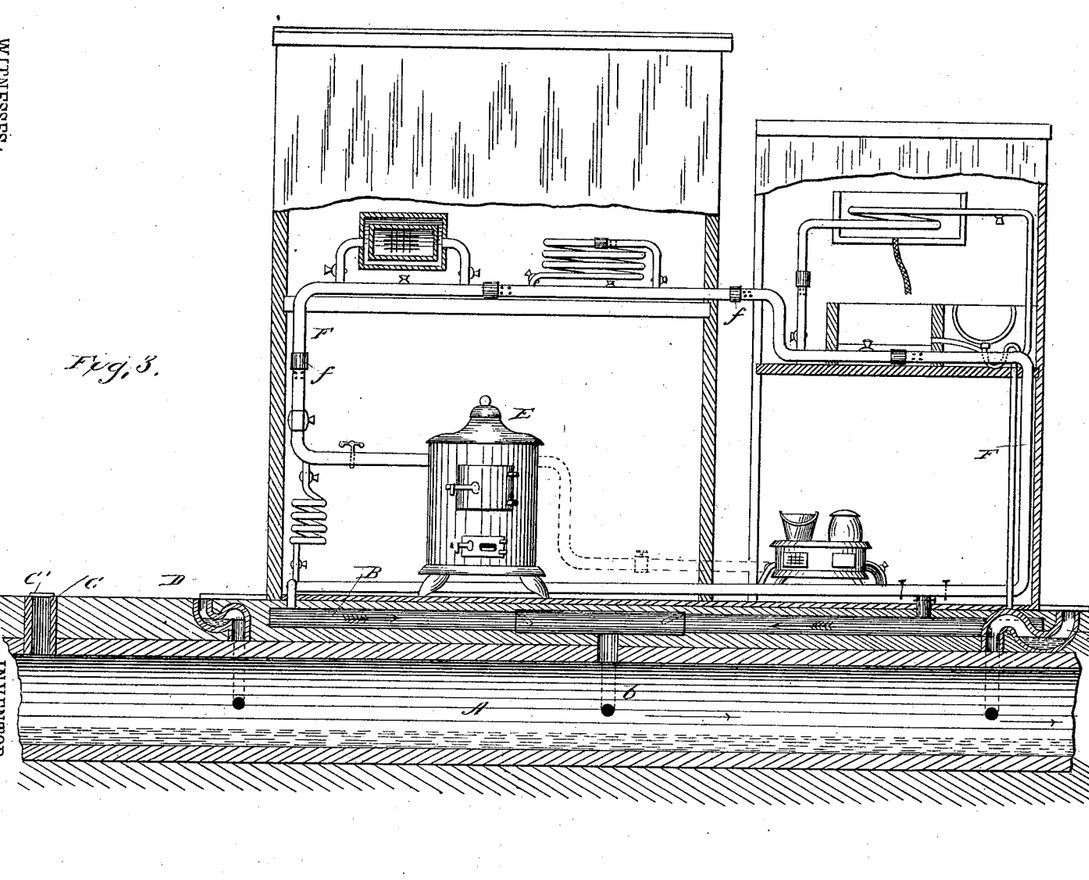
Fig. 3 is a section showing the sewer with street-seals of varying strengths and the connections with heating apparatus.
Figure 4:
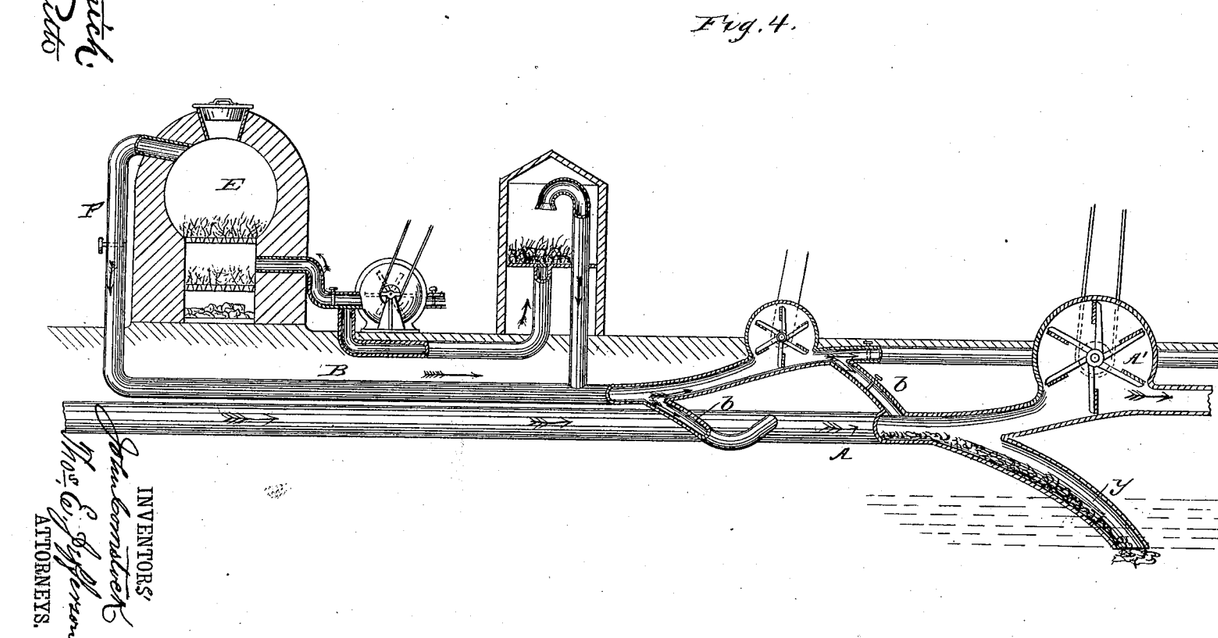
Fig. 4, an elevation, partly in section, showing the sewer and connected conduit and the submerged sewer-outlet.

In our application for utilization of heat, pipe-connections from furnaces, &c., were made to the sewer or other conduit, such pipes connecting various heat-utilizing devices, apartments, other buildings, &c., with each other, and also with the furnace and sewer, suitable cocks allowing the ready adjustment and deflection of heat at will, as seen in Figs. 2, 3, and 4. In each of these schemes the branch pipes, house-connections, &c., were provided with ventilators, registers, and check-valves—the former to allow the dilution of the passing products of combustion, the next to control the outflow at will, and the latter to automatically prevent backflow. Both of these systems for eliminating vitiated air and smoke, soot, &c., and the utilization of products of combustion greatly depend for their value upon the construction, adaptation, and arrangement of the sewer or other main which is the subject-matter of this application.

In this invention the sewer A is formed or reconstructed in such a manner as to be approximately air-tight by any suitable means for effecting that object, and the larger the sewer of a given diameter the nearer it should approach an air-tight condition in order that the suction apparatus A' may induce the partial vacuum and consequent air-current throughout its entire length. If the man-holes and other air-inlets from the streets were allowed to continuously admit sufficient air to replace that which had been displaced by the suction apparatus and to fill the partial vacuum caused by said apparatus, the objects of the present invention, or many of them, could not be attained. Hence not only must the sewer approximate an air-tight condition, but a reasonable care must also be exercised to construct the seals of sufficient strength to resist the inward atmospheric pressure due to the partial vacuum within, and as the suction apparatus will induce the strongest vacuum in its immediate vicinity the seals D of greatest strength are indicated in that locality, the seals of lesser strength being arranged in the ratio of their proximity to the fan, as shown in Fig. 3. The sewer A and the auxiliary conduit B, when thus constructed approximately air-tight according to this invention, may have ventilating or diluting connections at such points throughout its area, whether from apartments, furnaces, or streets, as may be desired, the same being provided with means for controlling the admission of air, and dilution and treatment of the gas may be effected as and where it may be required. The sewer and conduit should therefore be made so far air-tight that the suction apparatus will effect a partial vacuum throughout the entire area over which that particular apparatus is intended to operate to forcibly expel the commingled gases, and for this purpose the ordinary sewer with open manholes, air-inlets, and misapplied seals is found to be objectionable.

The suction apparatus A' is impelled by a steam-engine, X, or other motor which will allow its rate of speed to be readily adjusted to suit the service to be performed—as, for instance, in warm weather, when much ventilation through the apartment-connections may be required, a much higher rate of speed in order to reach the farthest limits of the sewer over which that fan has control is necessary, while in winter the ventilation through the furnace-connections may be sufficient for all purposes and a lower rate of speed be indicated. This adjustment of the fan force also accommodates the more or less air-tight condition of the sewer, and it may be adjusted to suit sewers of different capacities and lengths. The degree of fan speed required may be readily ascertained from the condition of the draft or vacuum in the sewer in places most remote from the fan. When but few of its inlets are open and it is desired to ventilate the sewer alone, a comparatively low rate of speed will be sufficient to eliminate the sewer-gases.

In some places and under some circumstances—such as in large cities and very long sewers—it may be necessary to employ more than one fan or suction apparatus, and we provide for such contingency by dividing the area of sewer into sections, each section having a fan and engine, the fan having greatest force being located near the sewer-outlet and adapted to take all the gas, &c., from the next succeeding fan and have a surplus of power with which to create a partial vacuum between it and the next succeeding fan to effect the proper ventilation in that section, and so on, the fans being used collectively to eliminate the gas and hasten the discharge of sewage and decreasing in power from the sewer-outlet. (See Fig. 1.) Even this system of ventilation may not be sufficient in very large cities by reason of the sewer not being large enough to allow the volume of gas and sewage to be removed quickly, and in such emergency we divide up the system into independent working sections, each section having the important elements of this invention—that is, approximately air-tight sewer, powerful fan, ventilating-connections, with means for graduating inflow, and suitable exits for gas. When the sewer or other main has several gas-outlets a check-valve, $t'$, Figs. 13 and 15, may be necessary between each two sections to prevent a backflow of gas, &c., from one section to the succeeding one, interfering with the proper creation of a partial vacuum in such succeeding section, such valves being adapted to allow free passage of sewage and to allow the succeeding fan to work effectually upon the gas, &c., behind it.

C represents a man-hole or other inlet, so constructed as to form an approximately air-tight joint when the cover C' is in place. This cover is perforated, and is provided with a similarly-perforated disk, $C^2$. As the perforations are made more or less to correspond, more or less air is admitted into the sewer to dilute the gas, and this amount of inlet may always be graduated as occasion may require. The inlets F, Fig. 12, from the furnaces are also provided with graduating devices, as also are the ventilating-connections M, Fig. 12, with the buildings. $C^4$ represents a graduating-slide for a similar purpose.

Figure 1:
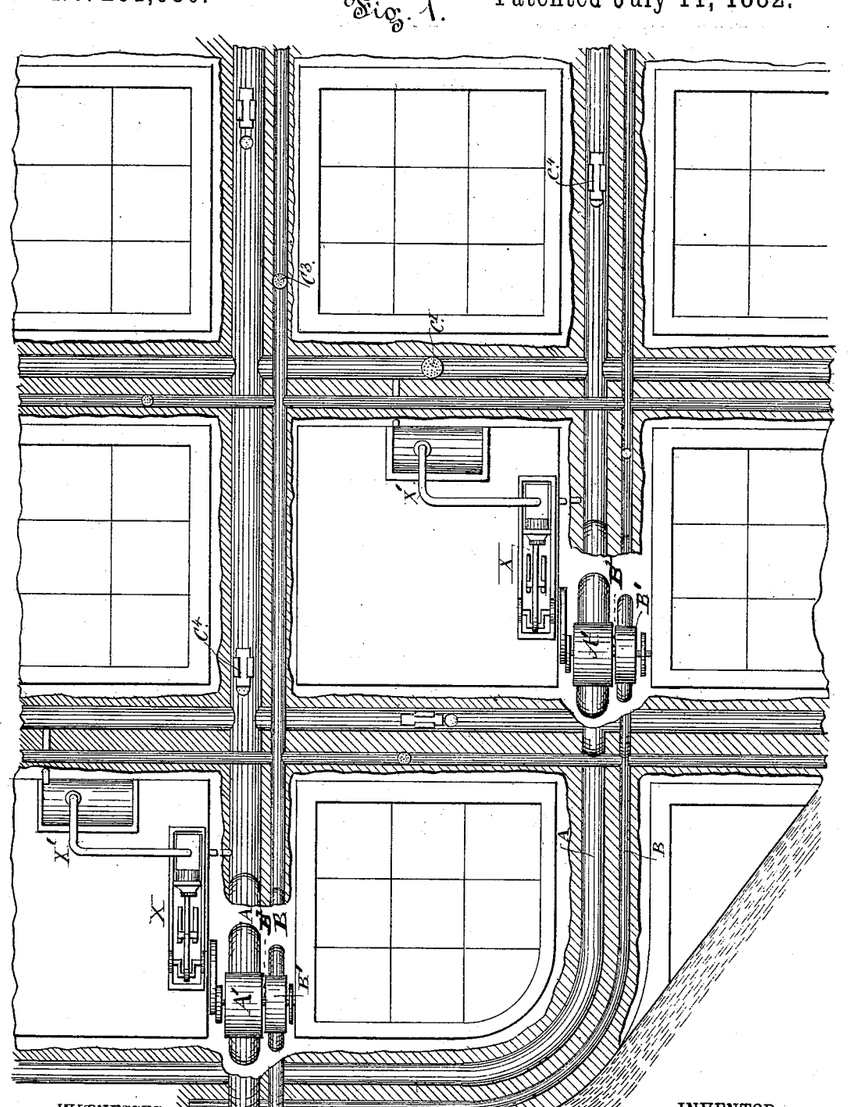
Figure 1 is a plan view of a section of a city laid out in squares, showing a sewer and auxiliary conduit connected together, a single engine serving as a motor for both, and means for admitting air into either, and at the same time graduating the amount of such inlet at will.
Figure 7:
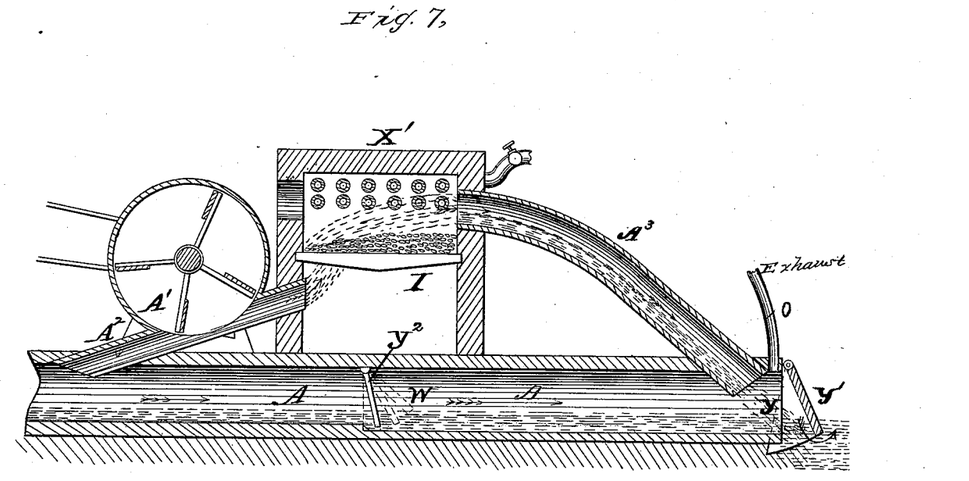
Fig. 7, a longitudinal section, showing the gas-burning furnace, the draft-inciting means, and the steam-exhaust serving to agitate the discharged sewage and water and products of combustion from said furnace.

The auxiliary conduit B connects with the sewer A by reason of branches $b$, and is provided with graduated air-inlets $C^3$. This conduit, as shown in Fig. 1, is provided with a fan, B', which induces a partial vacuum therein, the said fan being hung upon the shaft $B^2$, upon which is hung the fan A', the shaft being impelled by the engine X from steam generated in the boiler X' from the combustion of fuel and commingled smoke, soot, and gases in the furnace I, as shown in Fig. 7. In the last-named figure the gas is separated from the sewage and deflected upward through the pipe $A^2$ into the furnace I, the products of combustion from which are deflected by means of the curved pipe $A^3$ back into the sewer at the point of sewage-discharge Y. At this point the exhaust-pipe O of the engine X discharges the exhaust-steam to stir and agitate the sewage, gas, &c., in the water to remove the offensive qualities and cleanse them. The outlet of the sewer A is provided with a hinged hood, Y', which allows the free discharge of sewage, but prevents ingress of air, while a check valve or gate, $Y^2$, located between the sewer-outlet and the mouth $A^2$, automatically prevents the inlet of air, which would interfere with the working capacity of the fan A' and prevent its full force from being directed upon the gas behind it.

Figures 9, 11:
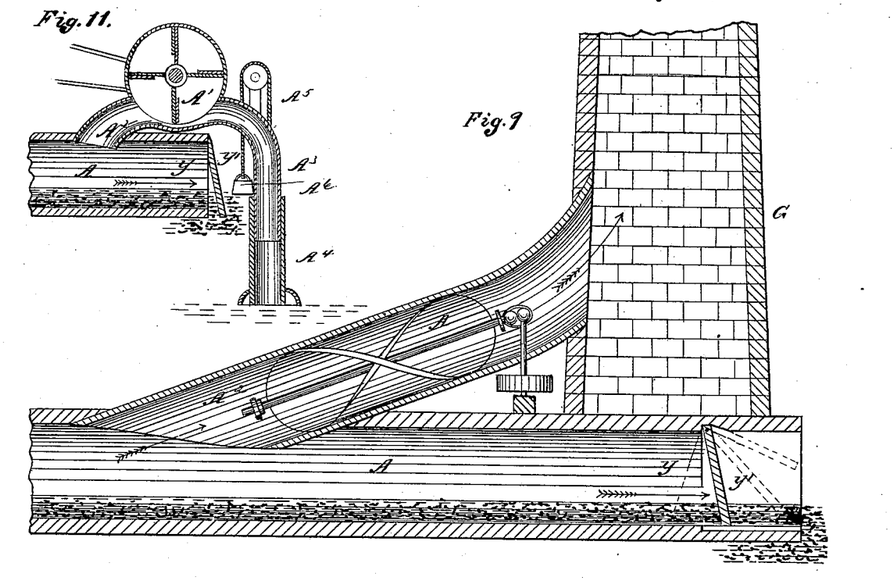
Figs. 9, 10, and 11 are details of modifications in the portions of the sewer near the outlet.

The pipe $A^3$, instead of leading back into the sewer, as shown in Fig. 7, may be provided with a vertically-sliding float-sleeve, $A^4$, which fits over a vertical portion of the pipe $A^3$, a rope, $A^5$, passing over a pulley and carrying a counterpoise, $A^6$, allowing it to rise and fall with the tide, but ever insuring that the products of combustion will be forced beneath the surface of the water to wash out the soot, oily products of combustion, &c., as seen in Fig. 11.

Figure 10:
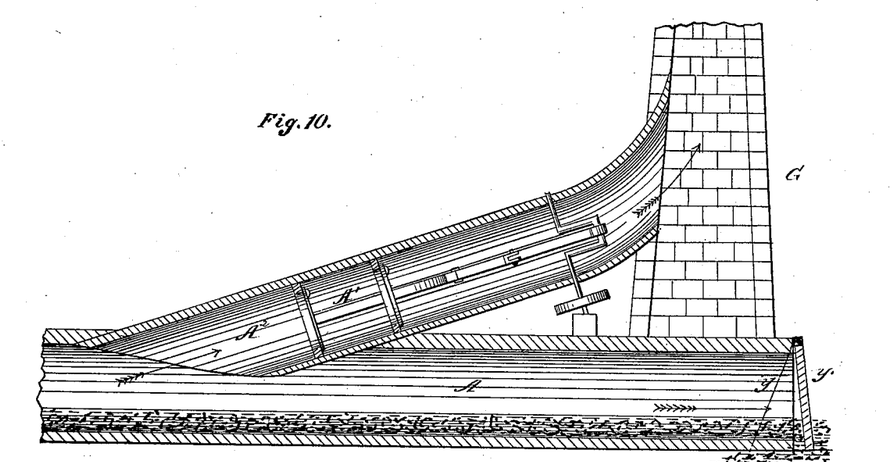

In Figs. 9 and 10 modifications of the suction apparatus are shown, and the separated gas from the sewer led or forced into a chimney for discharge.

When from any cause an obstruction occurs in the sewage it may readily be removed by admitting sufficient air behind it, the air-pressure induced by the suction apparatus being sufficient to impel it toward the outlet. (See Fig. 5.) The strong current of air and commingled gases thus constantly impelled through the main toward the outlet will, by acting upon the sewage, (upon the same principle as wind blowing up a bay accelerates the currents,) greatly accelerate and expedite the discharge of such sewage, thus preventing the generation of large quantities of poisonous gas from sluggish or choked-up sewers.

Figure 12:
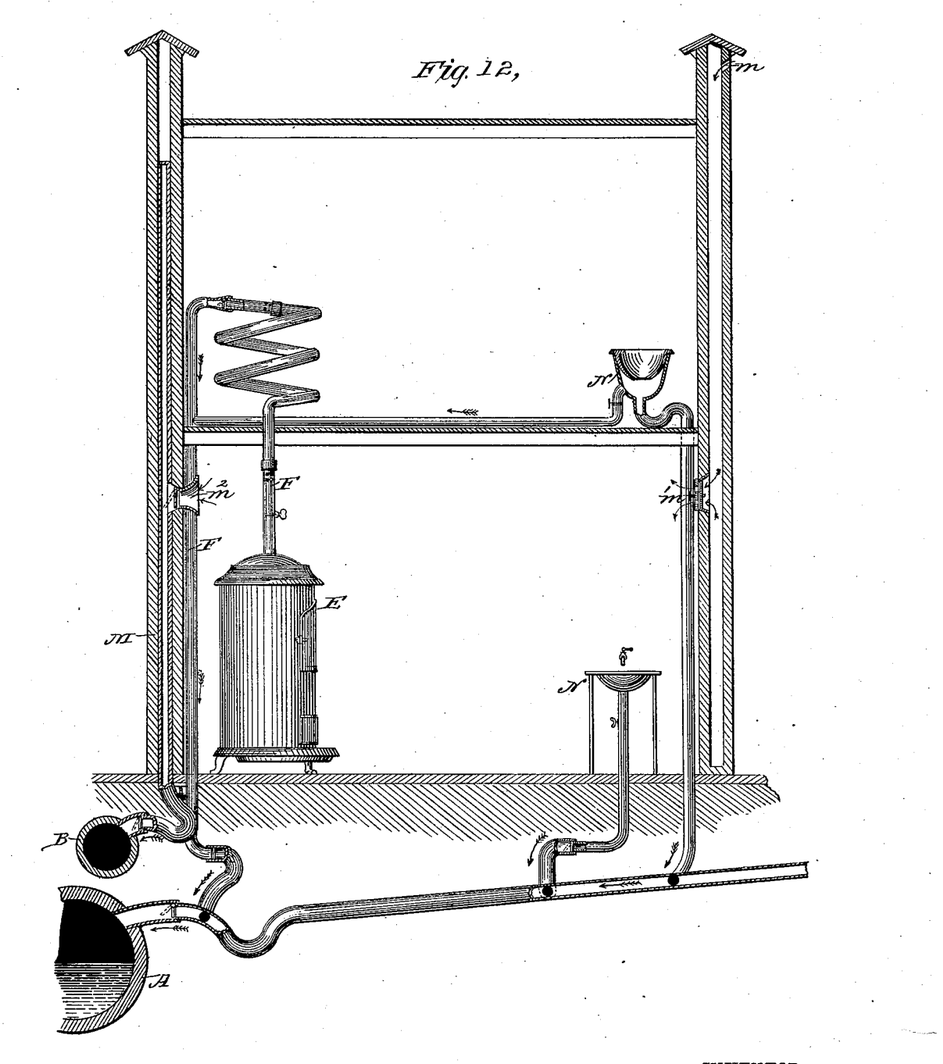
Fig. 12, a section showing the general system of ventilation, the furnace-connections, the sewer, and conduit.

It is well known that the longer any given quantity of sewage remains in a sewer the greater the quantity and more direful the effects of the sewer-gas generated. This invention designs not only quickly and forcibly eliminating the gas already generated, but to prevent further generation by hastening the elimination of the sewage itself. By means of this powerful draft induced within the sewer toward its exit and the connections with buildings along its line, all closets, bath-rooms, sinks, cesspools, cellars, &c., can be ventilated directly into the sewer, thus converting all those channels into avenues of purification.
The important features of the ventilating and heat utilizing, so far as they relate to this invention, are illustrated in Fig. 12, which shows one of a series of buildings. Fresh air is admitted at $m$, and passes into the apartments at $m'$. The vitiated air passes out at $m^2$ into pipe M, thence into conduit B as it is impelled by the fan B'. The furnace E, through the pipe F, connects with heat-utilizing devices (see also Fig. 3) and with the sewer A, where the carbonic products of combustion and surplus heat are utilized to purify the sewer-gas and prevent freezing of the sewage. Closets, sinks N, &c., connect with the sewer, and both gas and sewage are expedited to a discharge. Above the trap the water-closet basin is ventilated to the sewer through the pipe F, and all these features greatly depend for their importance and usefulness upon the system of sufficiently airtight sewers and the mechanically-induced draft, with means for preventing backflow.

Figures 13, 14, 15, 16:
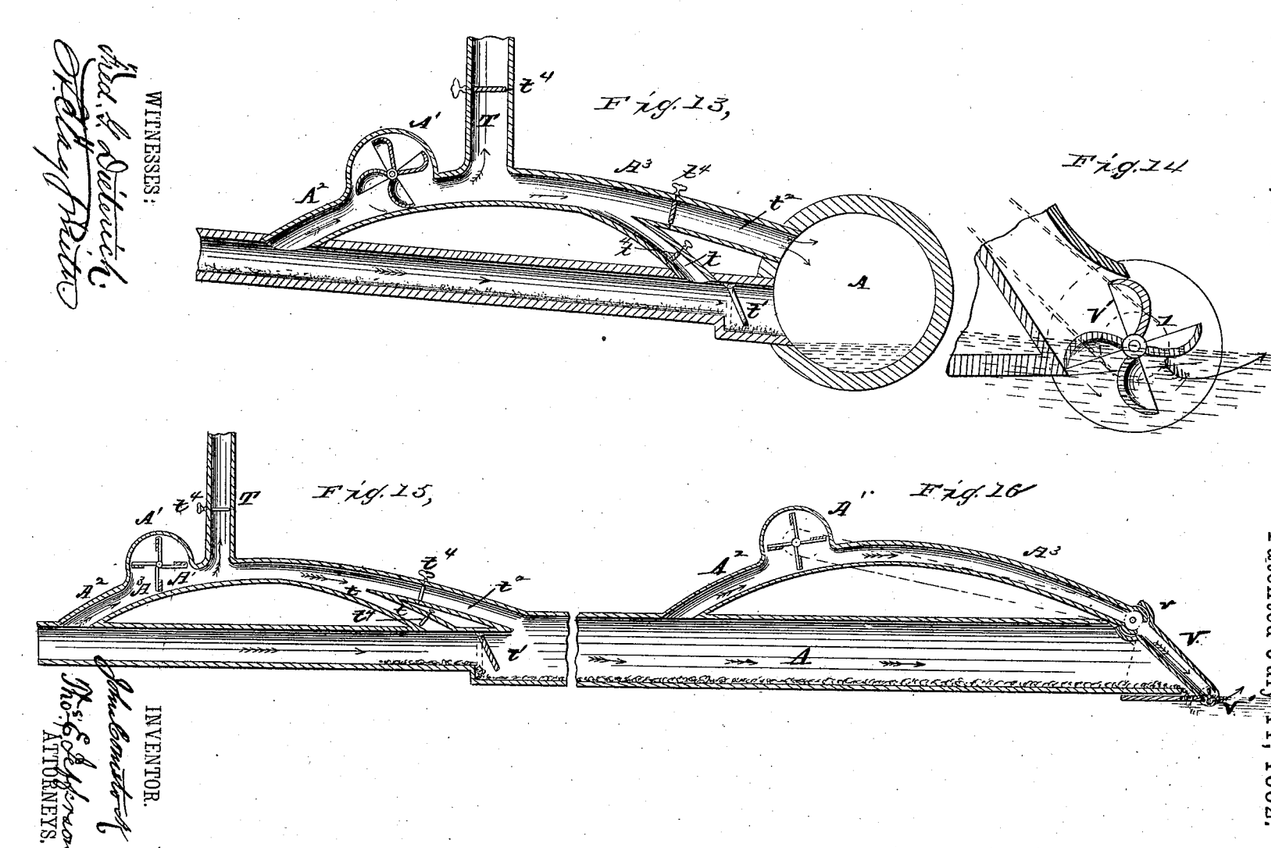
Figs. 13 and 15 are sectional views of a modification.
Figs. 14 and 16 are sections of portions of the sewer near its exit, showing means for forcing the gases, &c., under the water.

In Figs. 13 and 15 we show a branch sewer bifurcated to separate the gas from the sewage, the gas, &c., passing up the pipe $A^2$ as impelled by the fan A' and the sewage passing on to the main sewer A. At the apex of the curve made by the pipes $A^2$ $A^3$ is a chimney, T, and the pipe $A^3$ is again bifurcated, one portion, $t$, leading back to the sewer branch back of the check-valve $t'$, hung at the junction of the said branch and the main sewer A, and the other portion, $t^2$, leading directly into said sewer. By this construction the gas may either be directed into the branch back of the valve $t'$, directly into the sewer, or up the chimney T by properly turning the cocks or dampers $t^4$, as will readily suggest itself.

In Figs. 14 and 16, with a similar arrangement, is shown a hollow gate, V, at the mouth of the sewer A, hinged at $v$. By this construction the separated gases are forced through the gate into the water at the point of sewage-discharge, the lower end of the said gate being adapted to rest upon the water. Journaled in the lower portion of the gate V is a wheel or stirrer, V', the shaft of which is bolted to the motor in such a manner that the revolutions of the said wheel V' will not only force the smoke, soot, gas, &c., under the surface of the water, but the water at this point is greatly agitated thereby. This hollow gate V may be used in combination with the wheel V', or not, as required. With this construction the check-valve $Y^2$, Fig. 7, and the seal, Fig. 8, may be dispensed with.

The systems shown in Figs. 13 and 15 are especially adapted for service when the sewer system of a city is divided into working sections, as hereinbefore indicated. When thus segregated any section of the sewer may be opened for reconstruction or repair without subjecting the immediate neighborhood to the sewer-gas from adjoining sections, while the partial vacuum formed within the sewer, whether segregated or not, serves to prevent the escape of sewer-gas through leaks or holes which may accidentally occur.

It will be obvious that in case there is any temporary stoppage of the fan A' the gases from the pipe $A^3$ will seek the first exit through the chimney T, the valve therein being opened for that purpose.

Figure 5:
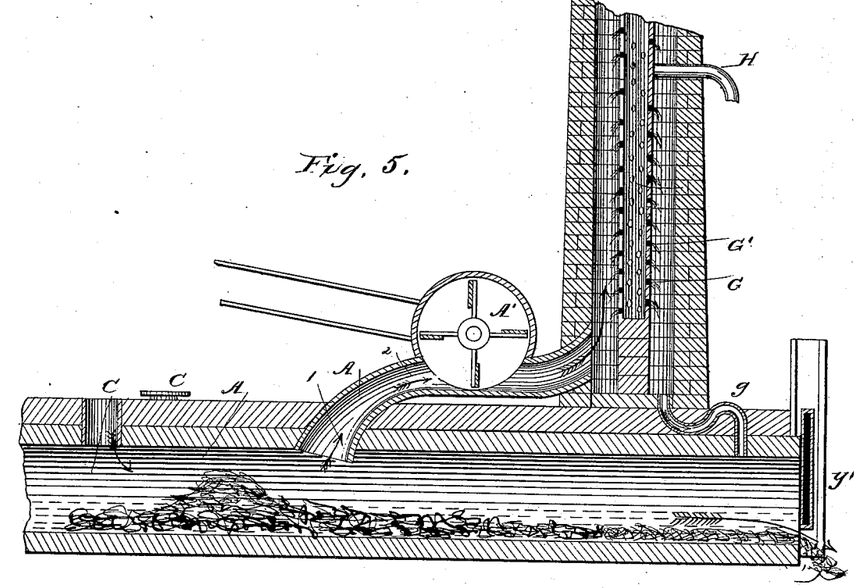
Figs. 5 and 6 show sectional views of means for washing the commingled gases.
Figure 6:
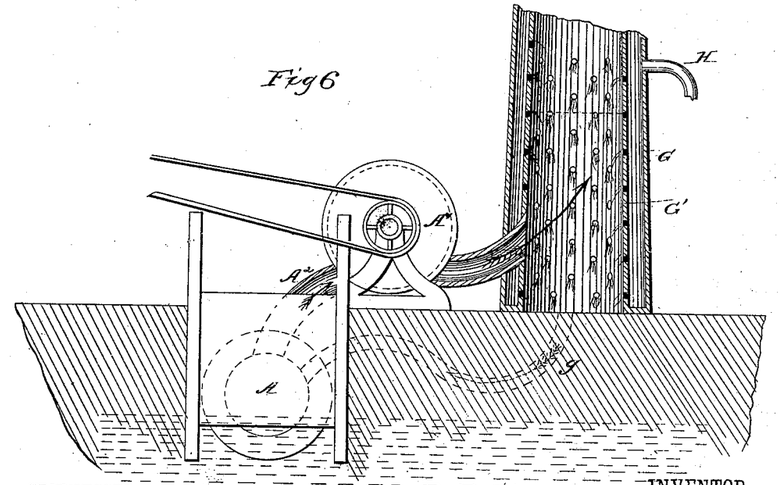

In Figs. 5 and 6 the gas is forced through the pipe $A^2$ into contact with water in the form of falling spray, which washes out the smoke, soot, &c., from the gases, such débris being carried back into the sewer near its outlet through the pipe $g$.

Any kind of suction apparatus of power or any form of sewer or conduit may be employed, and the seals be arranged in any manner that will withstand the pressure caused by the partial vacuum within the sewer.

Figure 8:
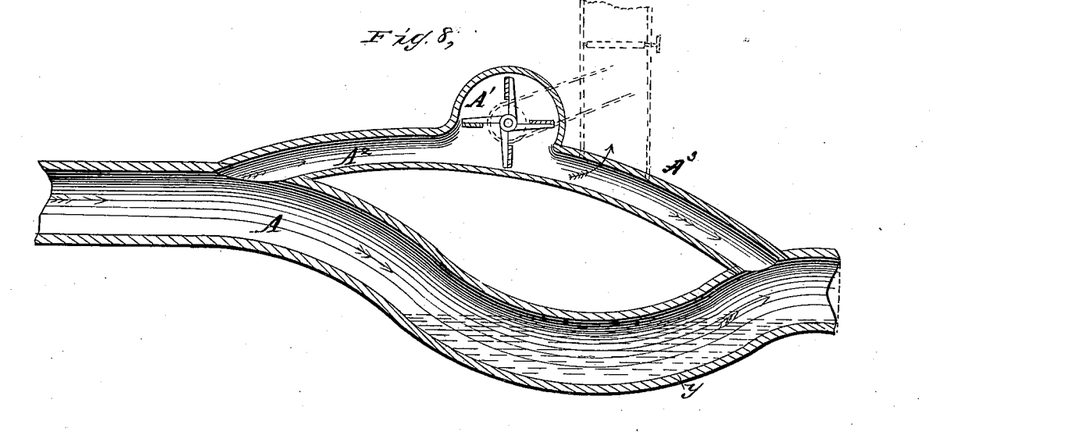
Fig. 8 represents a central section, showing the sewer trapped and a branch allowing the powerful draft of air, while the trap prevents backflow.

In Fig. 8 we show not only the gas and sewage separated through the pipe $A^2$, but the sewer itself trapped or sealed, as at Y. The fan A' creates the partial vacuum in the sewer behind the seal, and the pipe $A^3$ carries the thus extracted gases back to the sewer between the seal and outlet; or said gases may be conducted away through other means, as shown, Fig. 13, where a chimney and a continued pipe are used. With this construction it will be observed that a backflow within the sewer of gas or air is arbitrarily and automatically prevented by the sewage itself and without positive mechanical devices other than the construction of the sewer, thus enabling the fan to operate with full force upon the area of the sewer or section of a sewer behind it, and all risk of clogging or choking of gates, valves, or other mechanical appliances is absolutely avoided. Where several fans are required along the lines of a system of sewers to effect thorough ventilation it is intended that a single operating-fan will serve to prevent backflow of air-currents, gases, &c., should one or more of the fans stop for repairs or other purpose.

From the foregoing description of the means which we deem best adapted to carry out the principles of the invention, and from the objects sought to be attained, the following points are of great importance. It is known that the poisonous gases inherent in or generated from sewage will rise and seek the first outlet, and in ordinary sewers this action brings these gases to the inhabited portion of the city, owing to the fact that the sewage which generates the most poisonous gas is slowly seeking the sewer-outlet. To eliminate these poisonous gases from the sewer and its branches as quickly as possible is therefore one of the prime objects of the invention, and to accomplish this effectually and quickly the most effective means should be employed. The utilization of the products of combustion and the elimination of vitiated air from places which need ventilation are important features in this result. We find that contraction and expansion due to changes of temperature, corrosion from chemical action, clogging, &c., of mechanical devices, are liable to interfere with their prompt action; that positive force is necessary to expel the gases and vapors; that such force, to be operative, must incline the gas-current in one direction continuously; that other air, while it may be necessary to dilute the gases, must be prevented from interfering with the said current of air, and that the apparatus which creates the current must have full working force upon the gases, &c., behind it to create a partial vacuum within the sewer and its branches or connections. To these ends the invention contemplates the quick and certain removal of all the poisonous vapors and gases from the sewer and its various branches by means of a powerful suction apparatus creating a current toward the sewer-outlet and rendering this operation practicable by automatically preventing an inlet of air through such inlet, the sewer or other main being properly constructed for this purpose. The graduated inlets to sewers or mains are intended to close practically air-tight when necessary, and are adapted to be regulated and adjusted to admit more or less air where and when required.

What we claim as new, and desire to secure by Letters Patent, is—

1. The process of accelerating the movement of sewage and improving the capacity and usefulness of sewers, which consists in first rendering the sewers approximately air-tight, subjecting the contents thereof to a powerful air-current mechanically induced toward its outlet, and in automatically preventing an inflow of air through such outlet, or an air-current in an opposite direction, substantially as herein specified.

2. The method of accelerating the discharge of sewage and improving the usefulness and capacity of sewers, which consists in first rendering said sewers approximately air-tight, in subjecting the contents thereof to a powerful draft mechanically induced within said sewers in the direction of its outlet, in automatically preventing inflow of air through such sewer-mouth, or an air-current in an opposite direction, and in graduating the force of the draft to agree with the capacity of the sewer and the service to be performed, as set forth.

3. The method of removing obstructions from sewers, consisting in creating within such sewer a powerful air-blast in the direction of its exit, and in admitting air into the sewer behind the obstruction, in order that the pressure of said air against the obstruction will cause its ejection, as set forth.

4. The process of expediting the discharge of sewage in large cities and of eliminating the sewer-gas, consisting in dividing up the sewer system into independent working sections and mechanically inducing in each section a powerful draft in the direction of the sewer-outlet, in automatically preventing backflow of air or gas from one section to another, and in discharging directly from each section the poisonous sewer-gas, as specified.

5. The method of expediting the discharge of sewage, reducing the amount of sewer-gas being generated, and eliminating that already generated, consisting in dividing the sewer system of a city into separate working sections and mechanically creating in each section a powerful draft induced toward the sewer-exit, and in automatically preventing a backflow of air, &c., in an opposite direction, as specified.

6. An approximately air-tight sewer divided into working sections and each section provided with a suction apparatus, and all operating together to create a powerful draft in the direction of the sewer-outlet, the apparatus nearest said outlet being of sufficient force to take all the draft from the preceding apparatus and to have a reserve force to create a partial vacuum in its particular section throughout the series, as set forth.

7. An approximately air-tight sewer and a powerful suction apparatus for creating a draft therein in the direction of its outlet, combined with means for graduating the inlet of air at will and means for preventing inflow of air through the sewer-outlet, as set forth.

8. An approximately air-tight sewer having sealed outlet, and inlets with means for regulating inflow of air, combined with means for creating in said sewer a powerful current of air in the direction of the sealed outlet, as set forth.

9. An approximately air-tight sewer having graduated inlets and connections with apartments of buildings and similar inlets from stoves, furnaces, &c., combined with means for creating a powerful draft therein in the direction of the sealed outlet, as specified.

10. In combination with a sewer and its branches, rendered approximately air-tight as described, and having necessary graduated air-inlets, a power-fan or equivalent device for mechanically creating in such sewer a powerful draft in the direction of its outlet, said fan being capable of having its force adjusted at will in relation to the length of sewer to be operated upon, and means for automatically preventing a backflow of air or gas in said branches, substantially as specified.

11. An approximately air-tight sewer divided into working sections, as described, and each section having a powerful suction apparatus and a branch for the passage of gases, whereby the said gases are separated by said apparatus and the sewage in all the sections is expedited toward the main outlet, as set forth.

12. The conduits A B, connected together at *b*, and having graduated inlets, combined with the fans A' B', the motor X, and means for preventing backflow, as set forth.

13. In combination with an approximately air-tight sewer and powerful suction apparatus, as described, the man-hole cover C', having means for graduating the inlet of air at will, as set forth.

14. The combination of the conduit B and sewer A, the graduated pipe-inlets M $m^2$, the furnace-connection F, and the house-drains having means for preventing backflow, the suction apparatus A' B', and means for preventing backflow in the sewer, as set forth.

15. The sewer A, having submerged outlet Y, and graduated inlets, combined with the suction apparatus A' X, and adapted to serve as set forth.

16. The sewer A, bifurcated, as shown in Fig. 2, to allow the sewage to discharge through the submerged outlet Y and the poisonous gases to be carried farther along for discharge, burning, washing, or other treatment, as set forth.

17. The sewer A, trapped, as shown in Fig. 8, at or near its outlet, combined with the branch $A^2$ $A^3$ and with suction apparatus A', whereby backflow is automatically prevented, as specified.

18. A sewer branched or bifurcated as shown, adapted to separate the gas from the sewage and to discharge either at any point desired, combined with a powerful suction apparatus, and with proper means in each branch for automatically preventing backflow, as specified.

19. The hollow gate V, hinged at *v*, and having the stirrer or wheel V', combined with the sewer A, branch $A^2$ $A^3$, and motor.

20. The branch pipe $A^2$, fan A', and chimney T, combined with the bifurcated pipe $A^3$ and sewer A, and with the cocks or dampers $t^4$, as and for the purposes specified.

21. The combination of a sewer or other main having submerged or sealed outlet or outlets with means for creating a powerful draft within the sewer or main in the direction of said outlet or outlets, substantially as specified.

22. The combination, with the sewer A, having sealed or submerged outlet Y, of the suction apparatus A' and means for operating it, as set forth.

23. The sewer A, trapped and sealed at Y, as shown in Fig. 8, combined with the fan A' and adapted to automatically prevent a current of air or gas in a reverse direction, as set forth.

24. A sewer having graduated inlets, substantially as described, and provided with sealed outlet or trap Y, as shown, combined with a powerful suction apparatus for creating a current of air within said sewer, its branches, and connections toward the sewer-outlet, as set forth.

25. A sewer rendered approximately air-tight, as described, and having graduated air-inlets and sealed outlet or trap Y, combined with the suction apparatus A', and adapted to serve as and for the purposes set forth.

26. The method of removing obstructions from sewers, consisting in creating within such sewer a powerful air-blast in the direction of its exit, and in admitting air into the sewer through graduated air-inlets behind the obstruction, in order that the pressure of said air against the obstruction will cause its ejection, as set forth.

27. A sewer having means for producing a mechanical draft therein, and means for preventing backflow of air-currents, and inlets to admit concentrated blasts of air for the purpose of accelerating the movement of sewage or removing obstructions in sewers, as set forth.

28. A sewer having graduated man-hole inlets, as and for the purpose set forth.

29. A sewer having graduated inlets, in combination with a mechanical suction device, as set forth.

30. A sewer or main having graduated inlets and sealed outlet, as set forth.

31. A sewer or other main bifurcated near its outer end, with one branch submerged under water, permitting the outer passage of sewage, and the other branch combined with a suction apparatus for removing gases, vapors, &c., as set forth.

32. A sewer or main having graduated inlets and bifurcated near its outer end, with one branch submerged under water, permitting the outflow of sewage and preventing the inflow of air-currents, combined with a suction apparatus to incite a draft toward the exit of said sewer, as set forth.

33. The herein-described improvement in the art of sewering cities, consisting in dividing into working sections the sewage system of cities, and providing the sewers of each section with graduated inlets and independent suction apparatus and separate outlets for the removal of gas, &c., while the sewage has uninterrupted flow toward the main outlet, as set forth.

34. A sewer having connection with furnaces and an auxiliary conduit having connection with places to be ventilated, each provided with graduated inlets and with a suction apparatus hung upon a single shaft and impelled by a single motor, as set forth.

35. A sewer having connection with furnaces and an auxiliary conduit having connection with places to be ventilated, each provided with a suction apparatus hung upon a single shaft and impelled by a single motor, and means for preventing backflow, as set forth.

36. A sewer trapped as shown in Fig. 8, and having graduated inlets, combined with mechanical suction apparatus, as specified.

37. A sewer having means for preventing backflow of air-currents therein and suction apparatus for inciting a draft therein, and means for washing the gases by water or spray, as set forth.

38. The combination of a suction apparatus with a sewer, bifurcated near its outlet and provided with a hinged hollow gate at said outlet, said gate serving the double purpose of preventing ingress of air into the mouth of the sewer and directing the outlet of gases, &c., under water, as shown and set forth.

39. The combination of a suction apparatus with a sewer, bifurcated near its outlet and provided with a hinged hollow gate at said outlet and a wheel for forcing said gases under water, said gate serving the double purpose of preventing ingress of air into the mouth of the sewer and directing the outlet of gases, as shown and set forth.

40. A sewer system of a city divided into working sections, each section having independent suction apparatus, means for preventing backflow, and chimney for removing gas, &c., as set forth.

41. A sewer system of a city divided into working sections, each section having graduated inlets and independent suction apparatus and a separate chimney for removing gases, &c., as shown and set forth.

42. A sewer with graduated inlets $C^4$ and suction apparatus, as set forth.

43. A sewer with hinged double gate V, inlets $C^4$, and suction apparatus $A'$, as set forth.

44. A sewer with hinged double gate V, and wheel $V'$, and suction apparatus, as set forth.

45. A sewer having inlets $C^4$, in combination with double gate V, with wheel $V'$, and suction apparatus $A'$, as set forth.

46. A sewer, A, having fan $A'$, and a branch sewer with check-valve $t'$, as set forth.

47. The sewer A, having fan $A'$, in combination with branch sewer having check-valve $t'$ and suction apparatus, as set forth.

48. The sewer A, having fan $A'$ and graduated inlets $C^4$, in combination with branch sewer having check-valves $t'$, as set forth.

49. The sewer A, having fan $A'$ and inlets $C^4$, in combination with branch sewer, with its suction apparatus.

50. The sewer A, having fan $A'$ and inlets $C^4$, in combination with branch sewer having check-valve $t'$ and its suction apparatus, as set forth.

51. The sewer A, suction apparatus $A'$, graduated inlets $C^4$, and having sealed outlet V, in combination with a branch sewer and its fan, as set forth.

52. The sewer A, fan $A'$, inlets $C^4$, and sealed outlet Y, in combination with branch sewer having its suction apparatus and check-valve $t'$, as and for the purpose set forth.

53. The sewer A, provided with graduated inlets $C^4$, as set forth.

54. The sewer A, having sealed outlet Y and graduated inlets $C^4$, as set forth.

55. The sewer A, having sealed outlet Y and graduated inlets $C^4$, in combination with suction apparatus $A'$, as set forth.

In testimony whereof we affix our signatures in presence of two witnesses.

JOHN COMSTOCK.
THOMAS E. JEFFERSON.

Witnesses:
H. CLAY SMITH,
J. C. LATHROP.